US010890307B2

(12) United States Patent
Lu (10) Patent No.: US 10,890,307 B2
(45) Date of Patent: Jan. 12, 2021

(54) MULTI-FOCAL COLLIMATING LENS AND BI-FUNCTION HEADLIGHT ASSEMBLY

(71) Applicant: Lumileds Holding B.V., Schiphol (NL)

(72) Inventor: Kang Lu, Shanghai (CN)

(73) Assignee: Lumileds LLC, San Jose, CA (US)

( * ) Notice: Subject to any disclaimer, the term of this patent is extended or adjusted under 35 U.S.C. 154(b) by 0 days.

(21) Appl. No.: 16/577,193

(22) Filed: Sep. 20, 2019

(65) Prior Publication Data

US 2020/0103088 A1 Apr. 2, 2020

(30) Foreign Application Priority Data

Sep. 28, 2018 (WO) ................ PCT/CN2018/108200
Oct. 25, 2018 (EP) .................................... 18202672

(51) Int. Cl.
*F21V 5/04* (2006.01)
*F21S 41/20* (2018.01)

(52) U.S. Cl.
CPC ............ *F21S 41/285* (2018.01); *F21V 5/045* (2013.01)

(58) Field of Classification Search
CPC .......... F21S 41/285; F21S 41/20; F21S 41/25; F21S 41/26; F21S 41/265; F21S 41/275; F21S 41/141; F21V 5/045; F21V 5/04; F21V 5/00; G02B 3/10; G02B 3/00
See application file for complete search history.

(56) References Cited

U.S. PATENT DOCUMENTS

| 2008/0310159 | A1* | 12/2008 | Chinniah | F21S 41/322 |
| | | | | 362/244 |
| 2016/0265734 | A1* | 9/2016 | Kanayama | F21S 41/663 |
| 2017/0030542 | A1 | 2/2017 | Gromfeld | |

FOREIGN PATENT DOCUMENTS

| EP | 2543926 A2 | 1/2013 |
| WO | 2014016227 A1 | 1/2014 |
| WO | 2018166911 A1 | 9/2018 |

OTHER PUBLICATIONS

Extended European Search Report dated Apr. 24, 2019, European Patent Application No. 18202672.4, 8 pages.
PCT/EP2019/073047, "International Search Report and Written Opinion," 14 pages.

* cited by examiner

*Primary Examiner* — Bao Q Truong (57) ABSTRACT

The embodiments of the invention provide a multi-focal collimating lens and a bi-function headlight assembly. With the relative positions referring to the mounting position of the multi-focal collimating lens within the bi-function headlight assembly, the multi-focal collimating lens includes a lower collimating lens part and an upper collimating lens part located on top of the lower collimating lens part. One focal point of the lower collimating lens part is located on a vertical symmetry plane of the lower collimating lens part, and two focal points of the upper collimating lens part are symmetrically located on both sides of a vertical symmetry plane of the upper collimating lens part, so that a cut-off line of a low beam can be generated in a far-field light pattern of the multi-focal collimating lens.

15 Claims, 5 Drawing Sheets

MULTI-FOCAL COLLIMATING LENS AND BI-FUNCTION HEADLIGHT ASSEMBLY

CROSS REFERENCE TO RELATED APPLICATIONS

This application claims priority to International Application No. PCT/CN2018/108200 filed on Sep. 28, 2018 titled "MULTI-FOCAL COLLIMATING LENS AND BI-FUNCTION HEADLIGHT ASSEMBLY," and claims priority to European Application No. 18202672.4 filed on Oct. 25, 2018 and titled "MULTI-FOCAL COLLIMATING LENS AND BI-FUNCTION HEADLIGHT ASSEMBLY." International Application No. PCT/CN2018/108200 and European Application No. 18202672.4 are incorporated herein by reference.

TECHNICAL FIELD

The present invention relates to the field of lighting, in particular to a multi-focal collimating lens and a bi-function headlight assembly.

BACKGROUND

Figure 1:
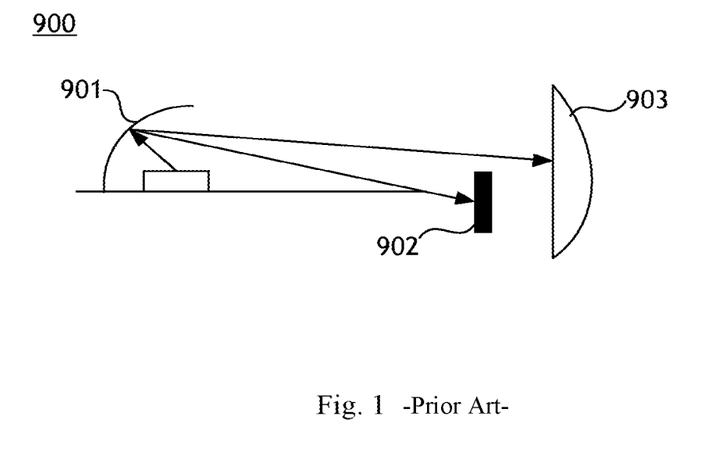
FIG. 1 is a schematic diagram illustrating a prior-art poly-ellipsoidal system.

Bi-function poly-ellipsoidal system solution for a head-lamp has been widely used in automotive lighting. Normal bi-function is built in poly-ellipsoidal system (PES) with movable shutter and fixed shutter. Generally speaking, in a bi-function poly-ellipsoidal system, a non-transparent shutter is utilized to enable switching between a high beam (HB, also known as an upper beam) and a low beam (LB, also known as a lower beam). As shown in FIG. 1, a poly-ellipsoidal system 900 includes a reflector 901, a fixed/movable opaque shutter 902 and a projection lens 903. However, shadowing by the shutter causes light loss compromising system efficiency.

Figure 2:
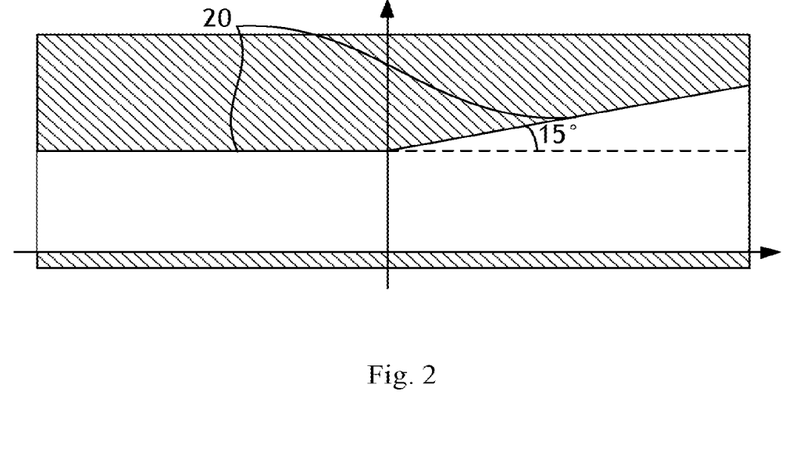
FIG. 2 is a schematic diagram illustrating a cut-off line in a standard for an automotive low beam.

Automotive headlights are typically required to operate in both a low beam and a high beam mode. The low beam mode is designed to restrict or constrain the upward projection of light, to avoid causing glare to oncoming road users. Low beam headlights are specified by local regulations. FIG. 2 is a schematic diagram illustrating a cut-off line 20 in a standard for automotive low beam. A low beam light generates a substantially horizontal upper cut-off line 20 in the projected light pattern, light is distributed in the region below the cut-off line 20. The cut-off line 20 typically sweeps or steps upward on the other side of the oncoming driver, so as to assist in illuminating road-signs and pedestrians.

SUMMARY

As has been mentioned above, normal bi-function is built in a poly-ellipsoidal system including at least a reflector, a fixed/movable opaque shutter and a projection lens. Because of the light loss caused by the opaque shutter it is desirable to provide a solution without such opaque shutter.

To this end, the embodiments of the invention provide a multi-focal collimating lens and a bi-function headlight assembly.

According to an aspect of the invention, a multi-focal collimating lens for a bi-function headlight assembly is provided. With the relative positions referring to the mounting position of the multi-focal collimating lens within the bi-function headlight assembly, the multi-focal collimating lens includes a lower collimating lens part and an upper collimating lens part located on top of the lower collimating lens part. One focal point of the lower collimating lens part is located on a vertical symmetry plane of the lower collimating lens part, and two focal points of the upper collimating lens part are symmetrically located on both sides of a vertical symmetry plane of the upper collimating lens part, so that a cut-off line of a low beam can be generated in a far-field light pattern of the multi-focal collimating lens.

With these three focal points, images of light sources can be respectively formed by different portions of the multi-focal collimating lens. The upper edge and lower edge of the multi-focal collimating lens can be shaped based on the three focal points, thus these images constitute a far-field light pattern with a clear cut-off line. Therefore, bi-function can be built by applying the multi-focal collimating lens.

Preferably, the two focal points of the upper collimating lens part are located on a horizontal bisection plane between the upper collimating lens part and the lower collimating lens part.

By arranging the two focal points on the horizontal bisection plane of the multi-focal collimating lens, the low beam light source can be located or adjusted according to a desired tilt angle of the low beam, facilitating the design.

Preferably, the focal point of the lower collimating lens part is located below the two focal points of the upper collimating lens part.

In some embodiments, the focal point of the lower collimating lens part is located below the two focal points of the upper collimating lens part, a far-field light pattern formed by the lower collimating lens part can thus be changed by adjusting a position of a light source corresponding to the lower collimating lens part.

Preferably, the upper collimating lens part includes an upper collimating lens portion and two total internal reflection lens portions respectively arranged on a left side and a right side of the upper collimating lens portion. The lower collimating lens part includes a lower collimating lens portion and two total internal reflection lens portions respectively arranged on a left side and a right side of the lower collimating lens portion. A light incident surface of the upper collimating lens portion includes two separated halves of a convex surface and a curved surface filling a gap between the two separated halves of the convex surface. A light incident surface of the lower collimating lens portion includes a convex surface.

With such an arrangement, the central collimating lens portions can be designed and manufactured based on a conventional convex lens. The two focal points of the upper collimating lens part can be determined based on the relative position of the separated halves of the convex surface, and the focal point of the lower collimating lens part can be determined by the convex surface of the lower collimating lens part. In such a manner, the simulation and determination for these three focal points can be simplified.

Preferably, the multi-focal collimating lens further includes a beam-shaping element located on a light exit surface of the upper collimating lens part.

The light beam emitted from the multi-focal collimating lens has a clear cut-off line in the far field. It is also advantageous to expand or narrow the light beam in some applications. A beam-shaping element can thus be located on the light exit surface of the upper collimating lens part to provide the desired shaping function for the low beam, such as expanding, narrowing or local distortion.

Preferably, the beam-shaping element includes a group of first cylindrical lenses arranged closely in parallel. A length direction of the first cylindrical lenses is parallel to the vertical symmetry plane of the upper collimating lens part of the multi-focal collimating lens.

The first cylindrical lenses can be applied for expanding the light beam emitted from the multi-focal collimating lens, while the clear cut-off line is maintained due to a zero diopter of the first cylindrical lenses in the vertical direction.

Preferably, the beam-shaping element further includes a group of second cylindrical lenses arranged closely in parallel. The group of second cylindrical lenses is arranged at least one of a left and right portion of the light exit surface. A length direction of the second cylindrical lenses and the length direction of the first cylindrical lenses form a predetermined angle.

To form a desired cut-off line sweeping upward on the other side of the oncoming driver, the second cylindrical lenses can be applied on the left and/or right portion of the light exit surface. With the shaping function of the second cylindrical lenses, a slanted portion of the cut-off line can be obtained without a complicated shape for the upper edge and lower edge of the multi-focal collimating lens.

Preferably, the beam-shaping element comprises a Fresnel lens.

A Fresnel lens can be applied for further collimating the light beam, without increasing the weight of the optical structure.

Preferably, the beam-shaping element is integrated on the light exit surface of the multi-focal collimating lens. Alternatively, the beam-shaping element is a separate module. The optical design for the multi-focal collimating lens is thus relatively flexible.

According to another aspect of the invention, a bi-function headlight assembly is provided. The bi-function headlight assembly includes the multi-focal collimating lens according to the above-mentioned embodiments, at least a first light source, and a second light source. A lower edge of a light emitting area of the first light source is located on a line connecting the two focal points of the upper collimating lens part. The focal point of the lower collimating lens part is located on a light emitting area of the second light source.

With such a configuration, the design for the location of the light sources can be simplified. In such a manner, the light sources generate a desired far-field pattern with a clear cut-off line. Moreover, bi-function can be built with a simplified configuration.

Preferably, a shape of the first or second light source is a rectangle, triangle, or pentagon. The first and second light sources are LED light sources, high intensity discharge lamps, or filament lamps.

LED light sources are energy saving and can also be formed with a desired shape. Therefore, an LED light source can be applied in the bi-function headlight assembly for an improved efficiency.

By applying the above mentioned bi-function headlight assembly in a vehicle, bi-function can be built with a simplified configuration, and an automotive low beam with a clear cut-off line can be obtained with improved energy efficiency due to the inventive design of the multi-focal collimating lens.

BRIEF DESCRIPTION OF THE DRAWINGS

The present invention will now be described based on various embodiments with reference to the accompanying drawings, in which.

DETAILED DESCRIPTION

Reference will now be made to embodiments of the disclosure, one or more examples of which are illustrated in the figures. The embodiments are provided by way of explanation of the disclosure, and are not meant as a limitation of the disclosure. For example, features illustrated or described as part of one embodiment may be used with another embodiment to yield still a further embodiment. It is intended that the disclosure encompass these and other modifications and variations as come within the scope and spirit of the disclosure.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Figure 3:
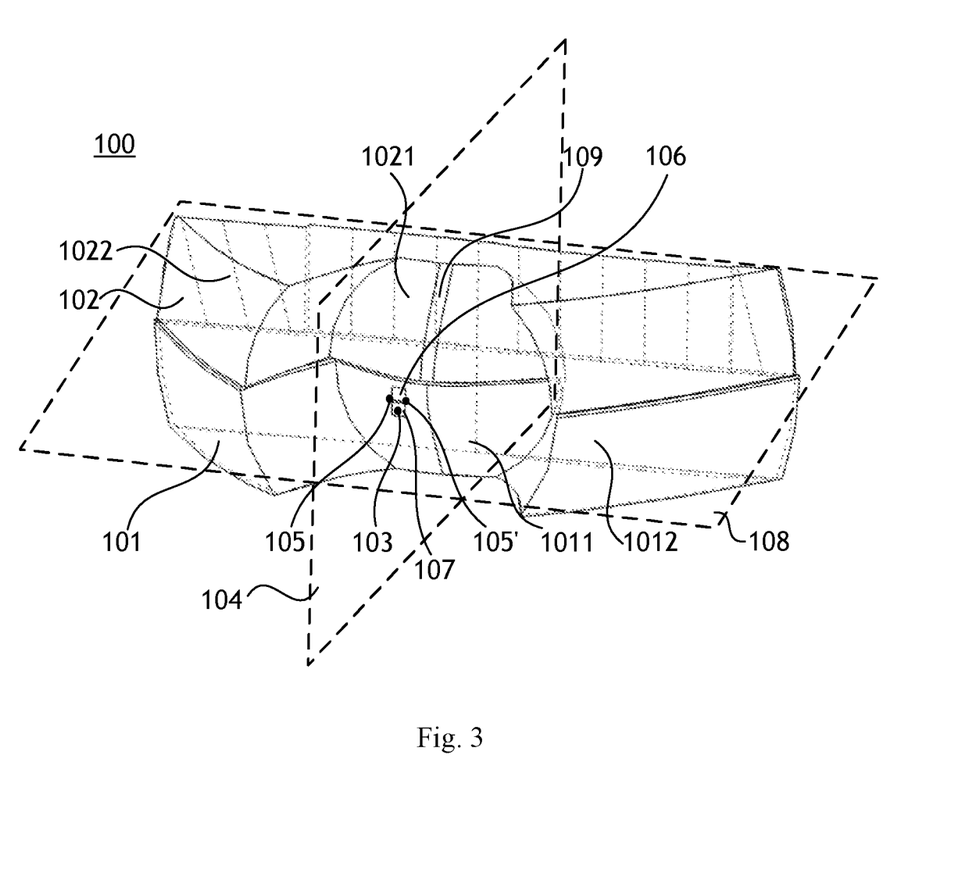
FIG. 3 is a schematic diagram of a multi-focal collimating lens according to an embodiment of the invention.

As shown in FIG. 3, an embodiment of the invention provides a multi-focal collimating lens 100 for a bi-function headlight assembly. With the relative positions referring to the mounting position of the multi-focal collimating lens within the bi-function headlight assembly, the multi-focal collimating lens 100 includes a lower collimating lens part 101 and an upper collimating lens part 102 located on top of the lower collimating lens part 101. One focal point 103 of the lower collimating lens part 101 is located on a vertical symmetry plane 104 of the lower collimating lens part 101, and two focal points 105, 105' of the upper collimating lens part 102 are symmetrically located on both sides of a vertical symmetry plane 104 of the upper collimating lens part 102 (where, in the embodiment shown in FIG. 3, the vertical symmetry planes 104 of the lower and upper collimating lens parts 101, 102 coincide), so that a cut-off line of a low beam can be generated in a far-field light pattern of the multi-focal collimating lens.

With these three focal points, images of light sources can be respectively formed by different portions of the multi-focal collimating lens. The upper edge and lower edge of the multi-focal collimating lens can be shaped based on the three focal points, thus these images constitute a far-field light pattern with a clear cut-off line. Therefore, bi-function can be built by applying the multi-focal collimating lens.

Figure 4:
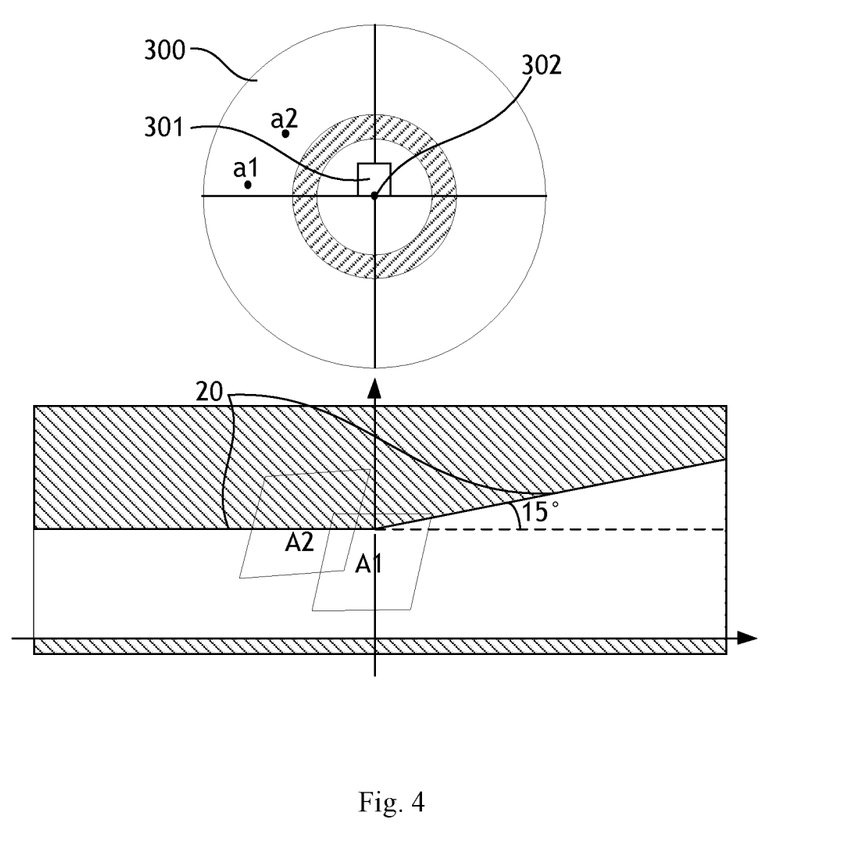
FIG. 4 shows a simulation result for far-field images of a light source formed by a TIR lens in the prior art.

FIG. 4 shows a simulation result for far-field images of a light source formed by a TIR lens 300 in the prior art. The upper portion of FIG. 4 illustrates the rear of the TIR lens 300 and a light source 301. Two points a1 and a2 are indicated on the surface of the TIR lens 300. For the TIR lens 300 in the prior art, only one focal point 302 is located on the intersection line of the vertical symmetry plane and the horizontal symmetry plane of the TIR lens 300.

The light from the light source 301 reflected by the regions of the TIR lens 300 around the points a1 and a2 forms far-field images A1 and A2 of the light source 301, see the lower portion of FIG. 4. These far-field images A1 and A2 are not completely located below the required cut-off line 20. Therefore, the TIR lens 300 in the prior art is not suitable for generating an automotive low beam.

In some embodiments of the present invention, as shown in FIG. 3, a first light source 106 and a second light source 107 are arranged respectively corresponding to the upper collimating lens part 102 and the lower collimating lens part 101. A lower edge of a light emitting area of the first light source 106 is located on a line connecting the two focal points 105, 105' of the upper collimating lens part 102. The focal point 103 of the lower collimating lens part 101 is located on a light emitting area of the second light source 107.

Figure 5:
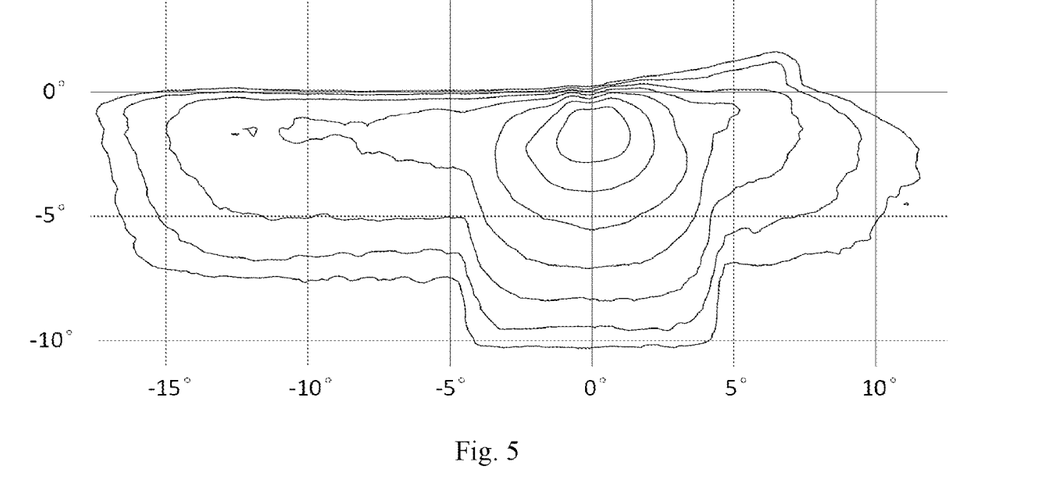
FIG. 5 shows a simulation result of a far-field light pattern according to an embodiment of the invention, in which only the low beam light source is lit up.
Figure 6:
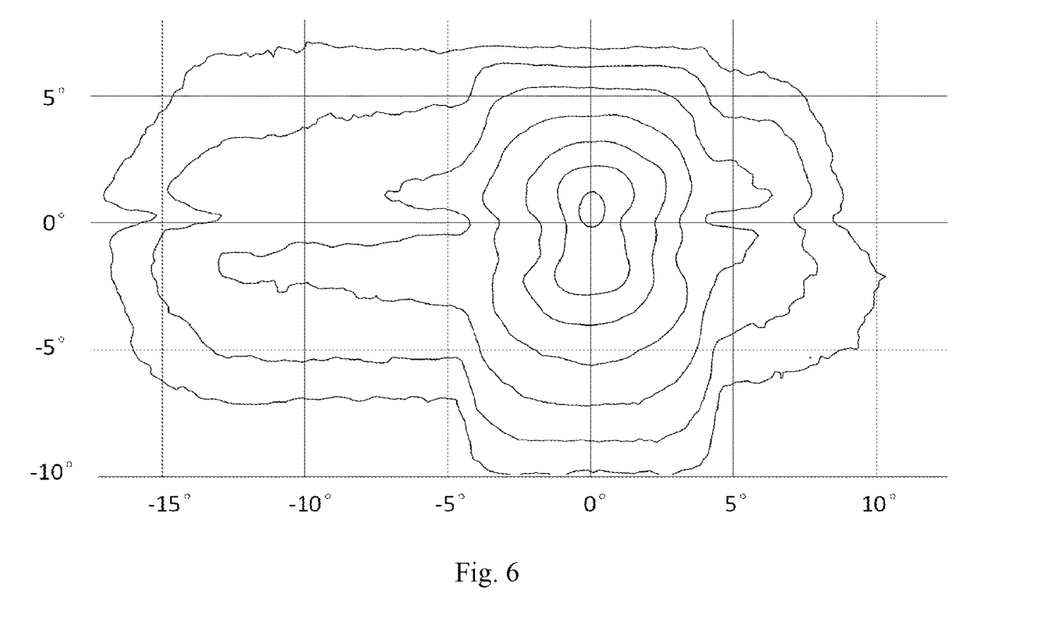
FIG. 6 shows a simulation result of a far-field light pattern according to an embodiment of the invention, in which both the low beam light source and the high beam light source are lit up.

FIG. 5 shows a simulation result of a far-field light pattern according to an embodiment of the invention, in which only the low beam light source (i.e., the first light source 106 of the embodiment shown in FIG. 3) is lit up. FIG. 6 shows a simulation result of a far-field light pattern according to an embodiment of the invention, in which both the low beam light source (i.e., the first light source 106 of the embodiment shown in FIG. 3) and the high beam light source (i.e., the second light source 107 of the embodiment shown in FIG. 3) are lit up. Therefore, bi-function can be achieved by selectively lighting the first light source, the second light source, and the combination thereof.

As can be seen from FIG. 5, the far-field light pattern is completely located below the required cut-off line. By applying the multi-focal collimating lens and controlling the low beam light source and the high beam light source, far-field light patterns satisfying local regulations can be obtained.

A distance may be arranged between the first light source 106 and the second light source 107. The location of the focal point 103 mainly determines a far-field position of the high beam, thus the distance may be selected based on a desired far-field position of the high beam.

Preferably, as shown in FIG. 3, the two focal points 105, 105' of the upper collimating lens part 102 are located on a horizontal bisection plane 108 between the upper collimating lens part 102 and the lower collimating lens part 101.

By arranging the two focal points 105, 105' on the horizontal bisection plane 108 of the multi-focal collimating lens 100, the low beam light source 106 can be located or adjusted according to a desired tilt angle of the low beam, facilitating the design.

Preferably, as shown in FIG. 3, the focal point 103 of the lower collimating lens part 101 is located below the two focal points 105, 105' of the upper collimating lens part 102.

In some embodiments, the focal point of the lower collimating lens part is located below the two focal points of the upper collimating lens part, a far-field light pattern formed by the lower collimating lens part can thus be changed by adjusting a position of the high beam light source (e.g. the second light source 107) corresponding to the lower collimating lens part 101.

Figure 7:
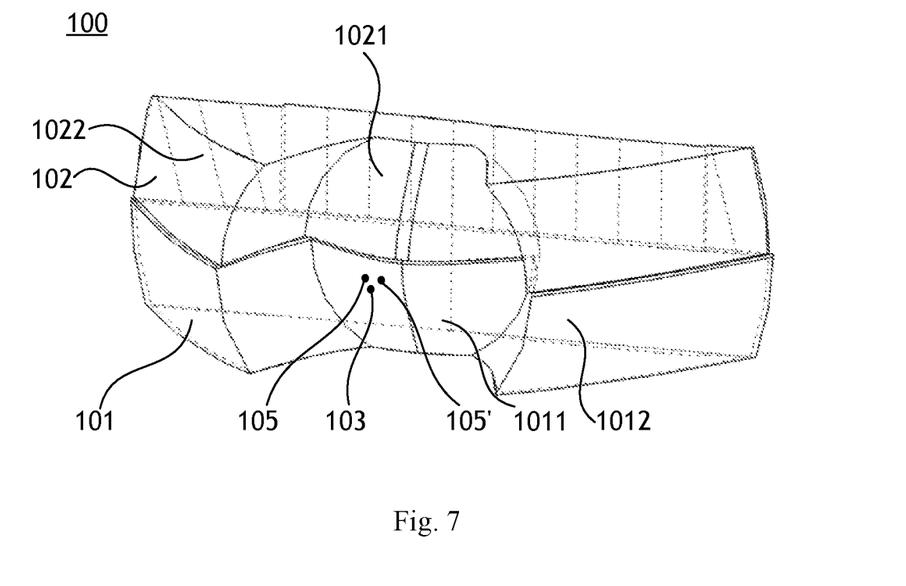
FIG. 7 is a schematic diagram illustrating formation of an upper collimating lens portion and a lower collimating lens portion in a multi-focal collimating lens according to an embodiment of the invention.

Preferably, as shown in FIG. 3 and FIG. 7, the upper collimating lens part 102 includes an upper collimating lens portion 1021 and two total internal reflection lens portions 1022 respectively arranged on a left side and a right side of the upper collimating lens portion 1021. The lower collimating lens part 101 includes a lower collimating lens portion 1011 and two total internal reflection lens portions 1012 respectively arranged on a left side and a right side of the lower collimating lens portion 101. A light incident surface of the upper collimating lens portion 102 includes two separated halves of a convex surface and a curved surface filling a gap 109 between the two separated halves of the convex surface. A light incident surface of the lower collimating lens portion 101 includes a convex surface.

With such an arrangement, the central collimating lens portions can be designed and manufactured based on a conventional convex lens. The two focal points 105, 105' of the upper collimating lens part 102 can be determined based on the relative position of the separated halves of the convex surface, and the focal point 103 of the lower collimating lens part 101 can be determined by the convex surface of the lower collimating lens part 101. In such a manner, the simulation and determination for these three focal points can be simplified.

It should be noted that the convex surface forming the separated halves of the upper collimating lens part 102 may be same to or different from the convex surface of the lower collimating lens part 101.

Figure 8:
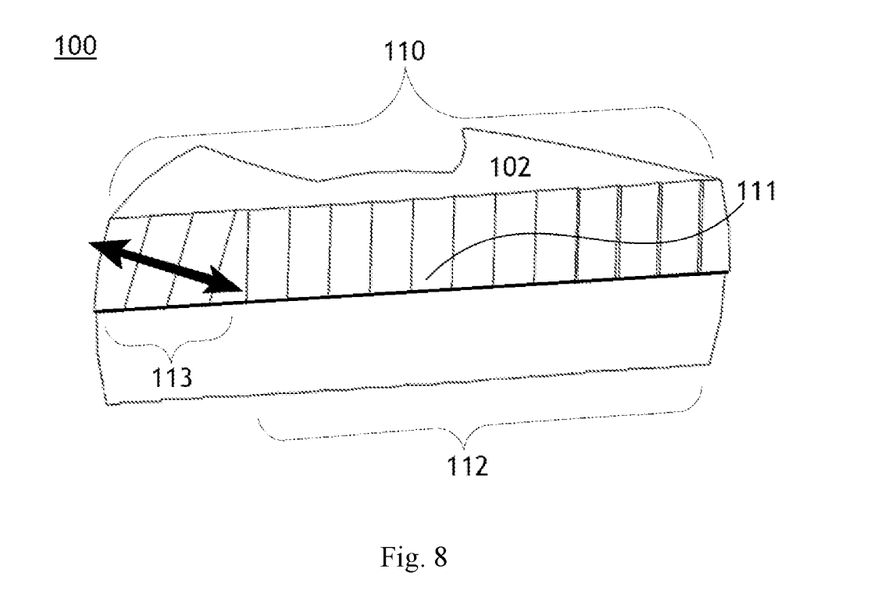
FIG. 8 is a schematic diagram illustrating a beam-shaping element in a multi-focal collimating lens according to an embodiment of the invention.

Preferably, as shown in FIG. 8, the multi-focal collimating lens 100 further includes a beam-shaping element 110 located on a light exit surface 111 of the upper collimating lens part 102.

The light beam emitted from the multi-focal collimating lens 100 has a clear cut-off line in the far field. It is also advantageous to expand or narrow the light beam in some applications. A beam-shaping element can thus be located on the light exit surface of the upper collimating lens part 102 to provide the desired shaping function for the low beam, such as expanding, narrowing or local distortion.

Preferably, as shown in FIG. 8, the beam-shaping element 110 includes a group of first cylindrical lenses 112 arranged closely in parallel. A length direction of the first cylindrical lenses 112 is parallel to the vertical symmetry plane (as indicated with 104 in FIG. 3) of the upper collimating lens part 102.

The first cylindrical lenses 112 can be applied for expanding (i.e., widening) the light beam emitted from the multi-focal collimating lens 100, while the clear cut-off line is maintained due to a zero diopter of the first cylindrical lenses 112 in the vertical direction.

Preferably, as shown in FIG. 8, the beam-shaping element 110 further includes a group of second cylindrical lenses 113 arranged closely in parallel. The group of second cylindrical lenses 113 is arranged at least one of a left and right portion of the light exit surface 111. A length direction of the second cylindrical lenses 113 and the length direction of the first cylindrical lenses 112 form a predetermined angle.

To form a desired cut-off line 20 sweeping upward on the other side of the oncoming driver (right part of cut-off line 20 inclining 15° upwards in FIG. 2), the second cylindrical lenses 113 can be applied on the left and/or right portion of the light exit surface 111. With the shaping function (shown with the outward arrows in FIG. 8) of the second cylindrical lenses 113, a slanted portion of the cut-off line can be obtained without a complicated shape for the upper edge and lower edge of the multi-focal collimating lens 100.

Preferably, the beam-shaping element comprises a Fresnel lens.

A Fresnel lens can be applied for further collimating the light beam, without increasing the weight of the optical structure.

Preferably, as shown in FIG. 8, the beam-shaping element 110 is integrated on the light exit surface 111 of the multi-focal collimating lens 100. Alternatively, the beam-shaping element is a separate module. The optical design for the multi-focal collimating lens is thus relatively flexible.

By applying the above mentioned bi-function headlight assembly in a vehicle, bi-function can be built with a simplified configuration, and an automotive low beam with a clear cut-off line can be obtained due to the inventive design of the multi-focal collimating lens.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

REFERENCE SIGNS

100: multi-focal collimating lens
101: lower collimating lens part
1011: lower collimating lens portion
1012: total internal reflection lens portion of lower collimating lens part
102: upper collimating lens part
1021: upper collimating lens portion
1022: total internal reflection lens portion of upper collimating lens part
103: focal point of lower collimating lens part
104: vertical symmetry plane
105, 105': focal points of upper collimating lens part
106: first light source
107: second light source
108: horizontal bisection plane
109: gap
110: beam-shaping element
111: light exit surface
112: first cylindrical lenses
113: second cylindrical lenses
20: cut-off line
300: TIR lens of prior art example
301: light source in prior art example
302: focal point of prior art TIR lens 300
a1, a2: reflection points on surface of prior art TIR lens 300
A1, A2: far-field images of light source 301 in prior art example
900: poly-ellipsoidal system of prior art
901: reflector
902: fixed/movable shutter
903: projection lens.

The invention claimed is:

1. A multi-focal collimating lens for a bi-function headlight assembly, comprising:
a lower collimating lens part and an upper collimating lens part located on top of the lower collimating lens part in a vertical direction parallel to a vertical symmetry plane of the lower collimating lens part, one focal point of the lower collimating lens part being located on the vertical symmetry plane of the lower collimating lens part, and two focal points of the upper collimating lens part being symmetrically located on both sides of a vertical symmetry plane of the upper collimating lens part, so that, due to the arrangement of the one focal point and the two focal points, a cut-off line of a low beam can be generated in a far-field light pattern of the multi-focal collimating lens.

2. The multi-focal collimating lens according to claim 1, wherein the two focal points of the upper collimating lens part are located on a horizontal bisection plane between the upper collimating lens part and the lower collimating lens part.

3. The multi-focal collimating lens according to claim 1, wherein the focal point of the lower collimating lens part is located below the two focal points of the upper collimating lens part.

4. The multi-focal collimating lens according to claim 1, wherein the upper collimating lens part comprises an upper collimating lens portion and two total internal reflection lens portions respectively arranged on a left side and a right side of the upper collimating lens portion; the lower collimating lens part comprises a lower collimating lens portion and two total internal reflection lens portions respectively arranged on a left side and a right side of the lower collimating lens portion;
wherein a light incident surface of the upper collimating lens portion comprises two separated halves of a convex surface and a curved surface filling a gap between the two separated halves of the convex surface;
and wherein a light incident surface of the lower collimating lens portion comprises a convex surface.

5. The multi-focal collimating lens according to claim 1, further comprising a beam-shaping element located on a light exit surface of the upper collimating lens part.

6. The multi-focal collimating lens according to claim 5, wherein the beam-shaping element comprises a group of first cylindrical lenses arranged closely in parallel; and wherein a length direction of the first cylindrical lenses is parallel to the vertical symmetry plane of the upper collimating lens part of the multi-focal collimating lens.

7. The multi-focal collimating lens according to claim 6, wherein the beam-shaping element further comprises a group of second cylindrical lenses arranged closely in parallel; wherein the group of second cylindrical lenses is arranged at least one of a left and right portion of the light exit surface; and wherein a length direction of the second cylindrical lenses and the length direction of the first cylindrical lenses form a predetermined angle.

8. The multi-focal collimating lens according to claim 5, wherein the beam-shaping element comprises a Fresnel lens.

9. The multi-focal collimating lens according to claim 5, wherein the beam-shaping element is integrated on the light exit surface of the upper collimating lens part; or, alternatively, the beam-shaping element is a separate module.

10. A bi-function headlight assembly comprising the multi-focal collimating lens according to claim 1, at least a first light source, and a second light source; wherein a lower edge of a light emitting area of the first light source is located on a line connecting the two focal points of the upper collimating lens part, and the focal point of the lower collimating lens part is located on a light emitting area of the second light source.

11. The bi-function headlight assembly according to claim 10, wherein a shape of the first light source or second light source is a rectangle, triangle, or pentagon.

12. The bi-function headlight assembly according to claim 10, wherein the first and second light sources are LED light sources, high intensity discharge lamps, or filament lamps.

13. The multi-focal collimating lens according to claim 1, wherein the cut-off line comprises a substantially straight portion and another portion that inclines upward toward a direction perpendicular to the substantially straight portion.

14. A bi-function headlight assembly comprising the multi-focal collimating lens according to claim 13 and at least a first light source, wherein none of the light emitted from the first light source and transmitted through the upper collimating lens part is above the cut-off line in the direction perpendicular to the substantially straight portion.

15. The multi-focal collimating lens according to claim 1, wherein the vertical symmetry plane of the lower collimating lens part and the vertical symmetry plane of the upper collimating lens part coincide.

\* \* \* \* \*